(12) United States Patent
Jones

(10) Patent No.: US 8,062,453 B2
(45) Date of Patent: Nov. 22, 2011

(54) METHOD FOR QUASI-INSTANTANEOUS POLYMERIZATION OF FILAMENT WOUND COMPOSITE MATERIALS

(75) Inventor: Brian H. Jones, Brea, CA (US)

(73) Assignee: BAE Systems Land & Armaments, L.P., Santa Clara, CA (US)

( * ) Notice: Subject to any disclaimer, the term of this patent is extended or adjusted under 35 U.S.C. 154(b) by 200 days.

(21) Appl. No.: 12/415,462

(22) Filed: Mar. 31, 2009

(65) Prior Publication Data

US 2010/0043764 A1    Feb. 25, 2010

Related U.S. Application Data

(60) Provisional application No. 61/041,816, filed on Apr. 2, 2008.

(51) Int. Cl.
   *B65H 81/08*    (2006.01)
(52) U.S. Cl. ........................................... 156/169
(58) Field of Classification Search .............. 156/169, 156/171, 173, 175; 425/118, 420
   See application file for complete search history.

(56) References Cited

U.S. PATENT DOCUMENTS

| | | |
|---|---|---|
| 3,019,206 A | 1/1962 | Robb et al. |
| 3,338,992 A | 8/1967 | Kinney |
| 3,341,394 A | 9/1967 | Kinney |
| 3,492,187 A | 1/1970 | Hirtzer |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,837,771 A | 9/1974 | Kolakowski et al. |
| 3,849,241 A | 11/1974 | Butin et al. |
| 4,340,563 A | 7/1982 | Appel et al. |
| 4,418,123 A | 11/1983 | Bunnelle et al. |
| 4,434,562 A | 3/1984 | Bubley et al. |
| 4,652,487 A | 3/1987 | Morman |
| 4,655,760 A | 4/1987 | Morman et al. |
| 4,657,802 A | 4/1987 | Morman |
| 4,720,415 A | 1/1988 | Vander Wielen et al. |
| 4,781,966 A | 11/1988 | Taylor |
| 4,789,699 A | 12/1988 | Kieffer et al. |
| 4,965,122 A | 10/1990 | Morman |

(Continued)

FOREIGN PATENT DOCUMENTS

DE    198 24 804 A1    12/1999

(Continued)

*Primary Examiner* — Troy Chambers
(74) *Attorney, Agent, or Firm* — Patterson Thuente Christensen Pedersen, P.A.

(57) ABSTRACT

A method of winding fibers on a mandrel, the wound fibers being in tension, includes providing a source of fibers, imposing a torque on the source that resists dispensing the fibers from the source to exert a tension on the fibers, adding ultra-violet sensitive material that is polymerized by exposure to ultra-violet light to a resin matrix, impregnating dispensed fibers with the additive containing resin matrix, rotating a mandrel to wind the impregnated fibers on the mandrel, the rotation of the mandrel acting to overcome the torque on the source and putting the fibers in tension, and in situ, quasi instantaneously polymerizing the additive containing resin matrix on the mandrel by means of exposing the additive containing resin matrix to ultra-violet light for a selected period of time, such polymerization acting to lock in the tension in the fibers at the time of polymerization. A rail gun fabricated by means of the above method is further included.

8 Claims, 15 Drawing Sheets

U.S. PATENT DOCUMENTS

| | | | |
|---|---|---|---|
| 4,981,747 A | 1/1991 | Morman | |
| 5,011,733 A | 4/1991 | Hiraki et al. | |
| 5,226,992 A | 7/1993 | Morman | |
| 5,332,613 A | 7/1994 | Taylor et al. | |
| 5,336,545 A | 8/1994 | Morman | |
| 5,385,775 A | 1/1995 | Wright | |
| 5,476,567 A | 12/1995 | Fujisawa et al. | |
| 5,514,470 A | 5/1996 | Haffner et al. | |
| 5,766,357 A | 6/1998 | Packer et al. | |
| 5,801,128 A | 9/1998 | Overstreet et al. | |
| 5,853,881 A | 12/1998 | Estey et al. | |
| 6,001,460 A | 12/1999 | Morman et al. | |
| 6,057,024 A | 5/2000 | Mleziva et al. | |
| 6,099,685 A | 8/2000 | Ito et al. | |
| 6,179,945 B1 | 1/2001 | Greenwood et al. | |
| 6,207,237 B1 | 3/2001 | Haffner | |
| 6,242,504 B1 | 6/2001 | Meyer-Roscher et al. | |
| 6,312,484 B1 * | 11/2001 | Chou et al. | 51/298 |
| 6,323,389 B1 | 11/2001 | Thomas et al. | |
| 6,387,179 B1 | 5/2002 | Anderson et al. | |
| 6,387,471 B1 | 5/2002 | Taylor et al. | |
| 6,570,714 B2 | 5/2003 | Soane et al. | |
| 6,767,852 B2 | 7/2004 | Friderich et al. | |
| 6,777,082 B2 | 8/2004 | Patel et al. | |
| 6,783,842 B2 | 8/2004 | Niepelt | |
| 6,794,024 B1 | 9/2004 | Walton et al. | |
| 6,808,789 B2 | 10/2004 | Pelkie et al. | |
| 6,893,529 B1 | 5/2005 | Öhman et al. | |
| 7,384,491 B2 | 6/2008 | Fitts, Jr. et al. | |
| 7,413,623 B2 | 8/2008 | Raday | |
| 2002/0019616 A1 | 2/2002 | Thomas | |
| 2002/0064653 A1 | 5/2002 | Ladika et al. | |
| 2002/0147273 A1 | 10/2002 | Patel et al. | |
| 2003/0124331 A1 | 7/2003 | Morell et al. | |
| 2004/0005832 A1 | 1/2004 | Neculescu et al. | |
| 2004/0123938 A1 | 7/2004 | Neculescu et al. | |
| 2004/0197588 A1 | 10/2004 | Thomas et al. | |
| 2005/0163960 A1 | 7/2005 | Lapin | |
| 2006/0055089 A1 | 3/2006 | Zhang et al. | |

FOREIGN PATENT DOCUMENTS

| | | |
|---|---|---|
| EP | 0 733 472 A2 | 9/1996 |
| EP | 1 246 881 B1 | 4/2004 |

* cited by examiner

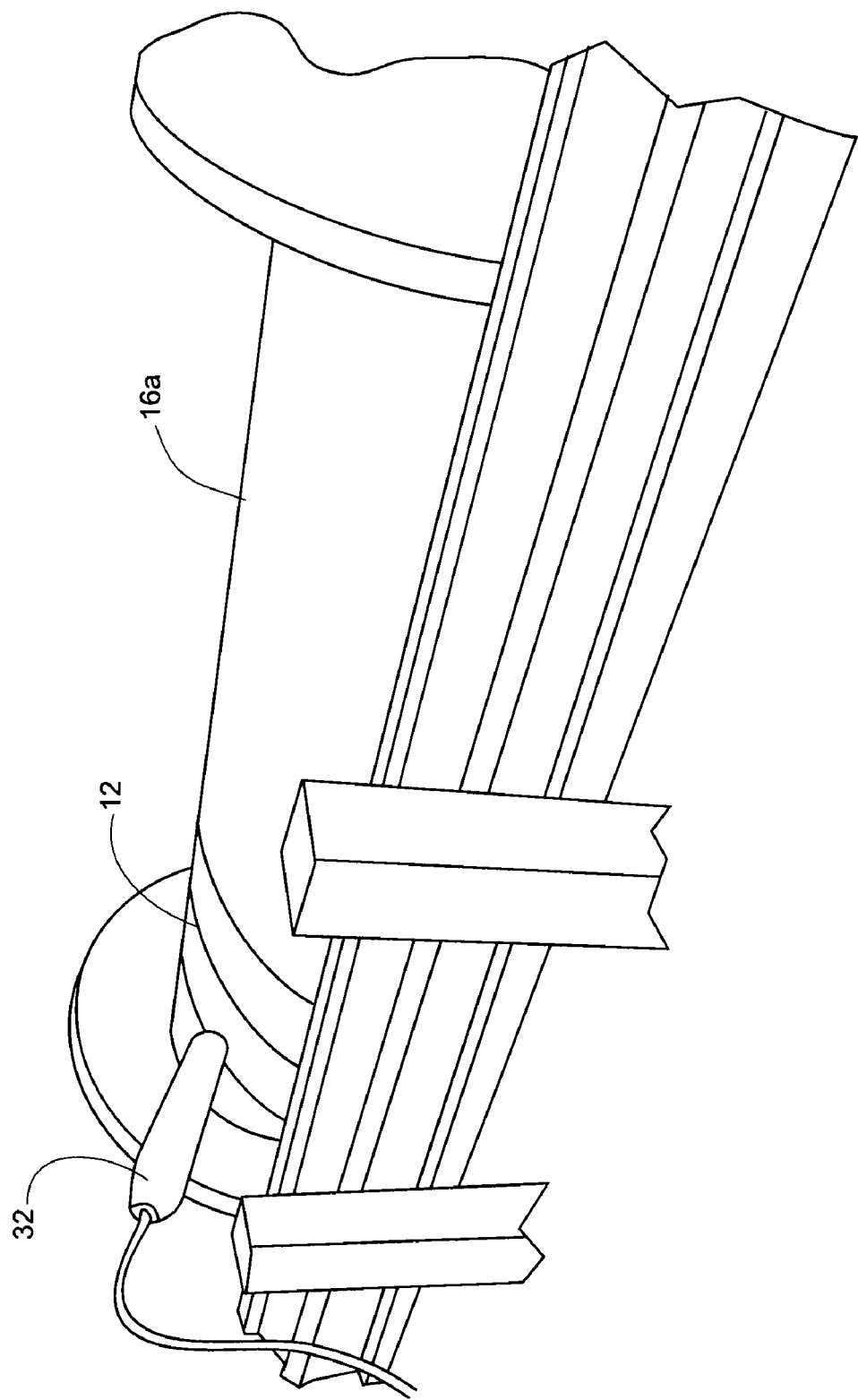

METHOD FOR QUASI-INSTANTANEOUS POLYMERIZATION OF FILAMENT WOUND COMPOSITE MATERIALS

RELATED APPLICATIONS

The present invention claims the benefit of U.S. Provisional Application No. 61/041,816, filed Apr. 2, 2008 and incorporated herein in its entirety by reference.

FIELD OF THE INVENTION

The present invention relates generally to filament winding methods used to produce components using composite materials. More particularly, the present application relates to an improved method of filament winding that involves continuously quasi-instantaneously polymerizing a resin matrix, using ultra violet light, as winding is taking place. This results in whatever tension is being applied to the filamentary material being maintained, thereby creating radial prestress that can be very advantageous in a number of applications.

BACKGROUND OF THE INVENTION

Filament winding is a well-known process that has been used in various industries to manufacture products having high structural efficiency in terms of strength and stiffness. Filament winding generally involves winding a fiber bundle that is impregnated with a thermosetting or, less generally, a thermoplastic resin matrix onto a suitably shaped mandrel or mold. Frequently, in this process, the mandrel is a body of revolution, but this does not have to be the case. The fiber bundle typically referred to as "tow" in the case of carbon or graphite or "roving" in the case of glass, is applied to the mandrel under tension. During filament winding, tension is applied to both maintain fiber collimation and to create radial stress ("prestress") in the component being wound. Once the mandrel is covered to the desired thickness, the mandrel is often heated in an oven autoclave to cure or set the resin. Following curing, the mandrel may be removed from the wound fiber and a hollow, high-efficiency structure remains. Alternatively, the prestressed fiber is left in place to provide a prestressed layer on the mandrel. Such is the case when the mandrel forms a rail gun or a gun barrel.

Prestressing has been used for centuries dating back to times of the Napoleonic Wars when wire was wrapped under tension onto cast cannon barrels to improve barrel life. This process generally was referred to as "autofrettaging" for metallic structures. Prestressing materials this way is known as an important process for manufacturing parts requiring substantial fatigue strength and structural integrity. Today, prestressing is used in a variety of industrial and military applications.

Wet filament winding is one type of filament winding. In wet filament winding, a thermoset resin is impregnated into dry fibers during the filament winding operation. However, during this process, radial stress created by fiber tension causes the resin to flow or migrate. When the resin migrates this way, tension begins to be lost. This problem is exacerbated during curing (polymerization) under heat, which typically causes a reduction in the viscosity of the resin.

In some instances, to prevent loss of tension, the curing is carried-out in stages in which layers were successively cured. However, staged winding generally requires time intensive manufacture.

Alternatively, in some instances, the use of a thermoplastic matrix in filament winding has been utilized to achieve the 'locking-in' of the applied fiber tension. This is typically done by instantaneously cooling-down the pre-heated resin 'in situ', as the fibers are being laid down. However, using such materials is generally unsuited for many applications, involving relatively high material costs and complex processing equipment.

The use of a thermosetting resin and 'in situ' curing using a combination of fast reacting resin matrix accelerators and the application of heat has also been proposed for continuously curing during the filament winding process. While high prestress components can be produced in this manner, the process is relatively difficult to carry out, requires cumbersome equipment and machines, does not provide much flexibility in operation, and utilizes a cure that is not truly "instant" and therefore permits some undesirable resin migration and lost tension.

It would be advantageous to improve upon present processes to enhance the functionality, reliability and safety associated with use of filament wound devices that require radial prestress to be present. Therefore, what is needed is a filament winding process which allows for an easily implemented and cost effective means for maintaining significant radial prestress by suppressing resin flow and the consequent loss of tension and radial pressure.

SUMMARY OF THE INVENTION

The present invention comprises a filament winding method for producing thick structures made of composite materials. This method generally includes the steps of providing a plurality of fibers that are placed in tension, impregnating a resin with additives that are caused to polymerize when exposed to ultra-violet radiation, wetting the plurality of fibers with the resin containing the additives, generating a tension in the fibers, winding fibers on a mandrel such that the plurality of fibers create radial pressure due to tension applied to the fibers, and continuously curing the plurality of fibers quasi-instantaneously by polymerizing the prestressed plurality of fibers as the fibers are about to contact the mandrel using ultra-violet (UV) light while the fibers are still under tension. Radial and tangential prestresses are accordingly continuously locked in during the process of forming a relatively thick, polymerized structure.

Generally in these embodiments, the fibers are impregnated with resin using a wet-out tank to infiltrate fiber filaments with resin containing the UV sensitive additives. In some embodiments, an infra-red heater is used to augment the cure initiated by the ultra-violet radiation of the resin as well.

In other embodiments, steps for manufacturing a rail gun barrel include providing a plurality of fibers that are placed in tension, impregnating a resin containing ultra-violet sensitive additives onto the plurality of fibers, winding the plurality of fibers onto the conductors and insulators that comprise the rail gun barrel while maintaining the tension in the fibers, and polymerizing the fibers quasi-instantaneously using ultra-violet light. The general outside configuration of such a product may typically be oval in cross section and of considerable length. In these embodiments, the tension used during the winding process may be as high as can be effectively achieved without damage to the fibers. Moreover, the radial prestress aids in preventing separation of the insulators from the conductors under the influence of the repelling magnetic forces that occur during operation of a rail gun. Further, helical windings can be applied to the mandrel or rail gun barrel. In such a case, a strip UV light source is caused to move along the rail gun barrel in a lagging disposition to the point of tangential application of the fibers to the rail gun barrel.

The present invention is a method of winding fibers on a mandrel, the wound fibers being in tension. The method includes providing a source of fibers, imposing a torque on the source that resists dispensing the fibers from the source to exert a tension on the fibers, adding ultra-violet sensitive material that is polymerized by exposure to ultra-violet light to a resin matrix, impregnating dispensed fibers with the additive containing resin matrix, rotating a mandrel to wind the impregnated fibers on the mandrel, the rotation of the mandrel acting to overcome the torque on the source and putting the fibers in tension, and in situ, quasi instantaneously polymerizing the additive containing resin matrix on the mandrel by means of exposing the additive containing resin matrix to ultra-violet light for a selected period of time, such polymerization acting to lock in the tension in the fibers at the time of polymerization. The present invention is further a rail gun fabricated by means of the above method.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2a is schematic view of a filament winding layout according to an embodiment of the present invention.

FIG. 2b is a partial side view schematic of the filament winding layout of FIG. 2a.

FIGS. 6a-b show the filament winding process according to an embodiment of the present invention.

Figure 1:
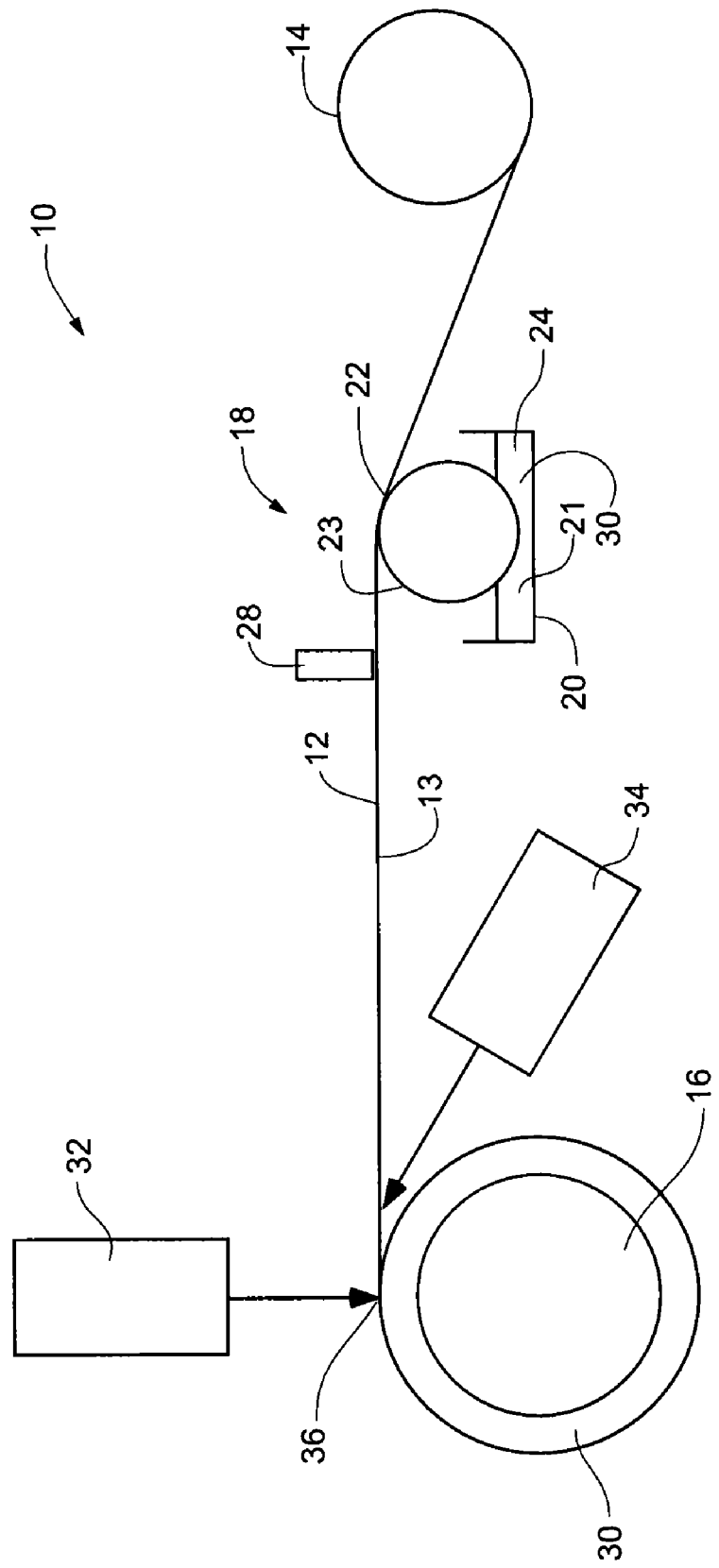
FIG. 1 is a typical schematic view of the filament winding process.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Figure 2:
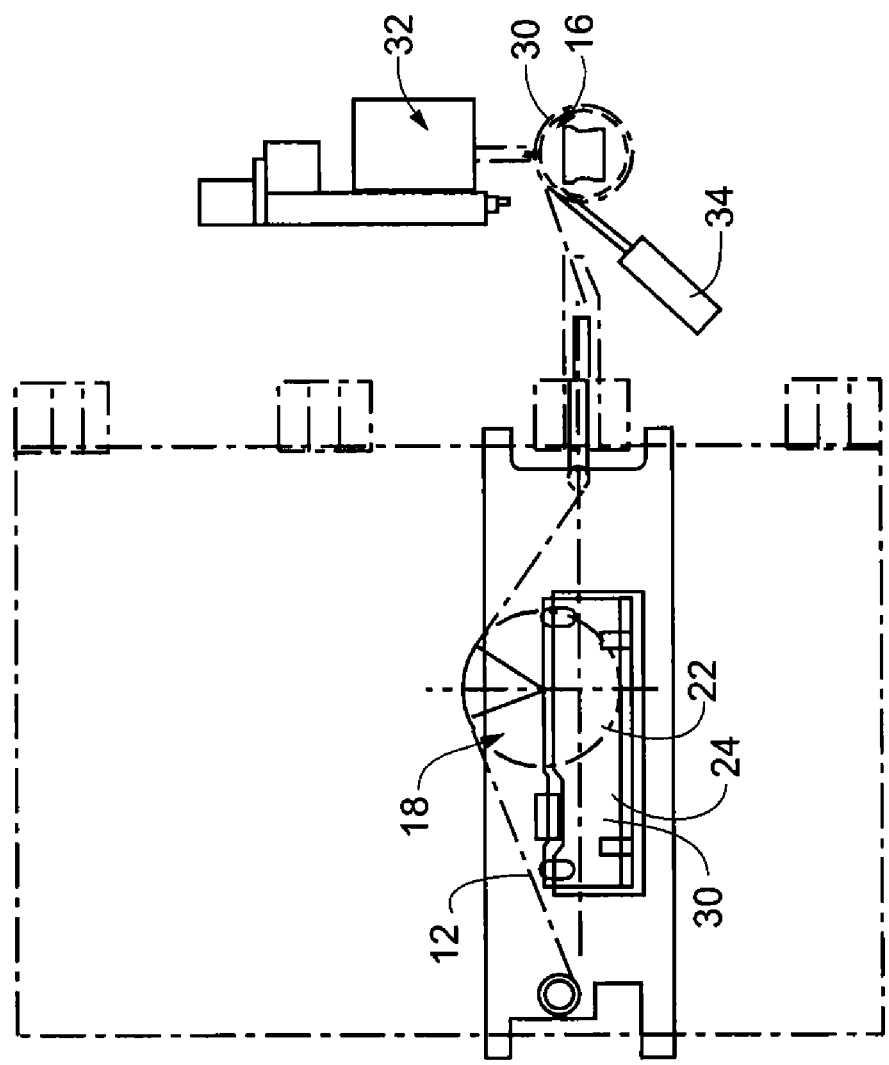
Figure 3:
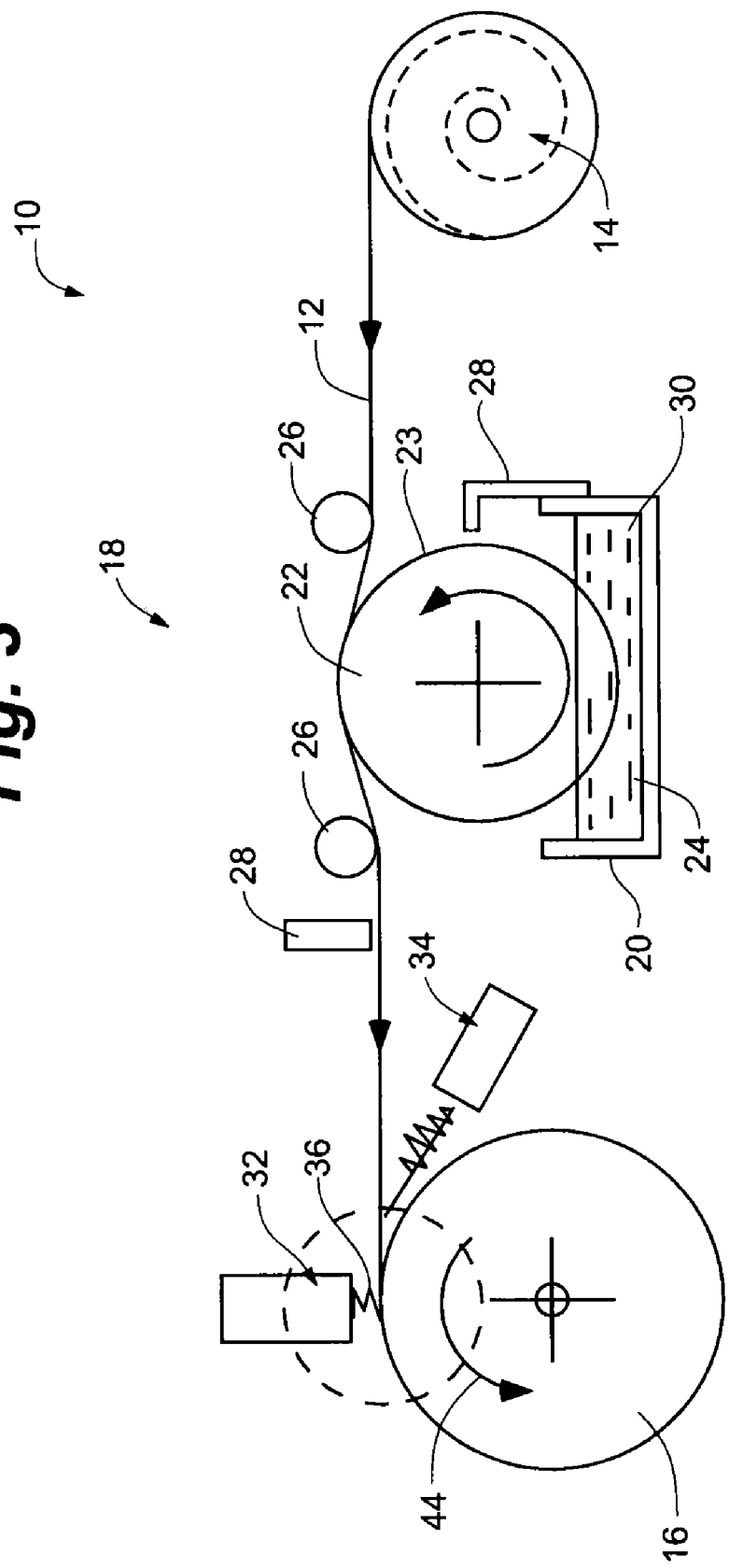
FIG. 3 is a schematic view of a filament winding layout according to an embodiment of the present invention.

Throughout the several figures, and initially to FIGS. 1-3, exemplary embodiments of a general layout for a filament winding process 10 is illustrated. In these figures, a fiber bundle 12, made up of a plurality of individual fibers 13, is shown in tension between a fiber spool 14 and a mandrel 16. A torque is typically applied to the spool 14 to resist the winding of the mandrel, thereby imposing a tension on the fiber bundle 12. This fiber bundle 12 may be made of a variety of filamentary materials, such as glass, carbon, or graphite, for example. As noted, the fiber spool 14 is acted upon by a resisting torque to place the fiber bundle 12 in tension as rotation of the mandrel 16 acts to overcome the resisting torque and unwind the fiber bundle 12 from the spool 14. In general, each of the respective fibers 13 comprising the fiber bundle 12 are subjected to tension in the range of 1 lb to 20 lb. The tension applied maintains fiber collimation (or straightness) and creates a state of radial stress or "prestress" in a component being wound.

After being pulled from the fiber spool 14, the fibers 13 are subjected to a resin impregnator 18, such as wet-out tank 20. During this step, fibers 13 are infiltrated with resin 21. While a typical wet-out tank 20 is described, a variety of other well-known approaches can be employed to infiltrate fiber filaments 13 with resin 21. In a drum type wet-out tank 20, such as the one seen in FIG. 3, the fibers 13 of the fiber bundle 12 are forced into contact with the resin-soaked exterior margin surface 23 of a drum 22. Drum 22 is generally partially submerged and rotated through a resin bath 24 for this wet-out impregnation. The resin 21 picked up by the drum 22 is consequently transferred to the surface 23 and thence to the fibers 13 of the fiber bundle 12. Feeding the fiber bundle 12 in tension across a drum 22 spreads out the respective fibers 13 and allows for adequate resin infiltration, including infiltration into the interstitial spaces in the tow.

Guide components 26, such as bars, rollers or combs may be used to ensure sufficient contact with the surface 23 of the drum 22 is experienced by the fibers 13. Generally, such guides 26 cause adequate angular contact with the surface 23 of the drum 22 to be effected. Further, an adjustable doctor blade 28 is shown mounted above the resin bath 24 for skimming off excessive resin 21 to achieve the desired resin-to-fiber ratio.

Figure 15:
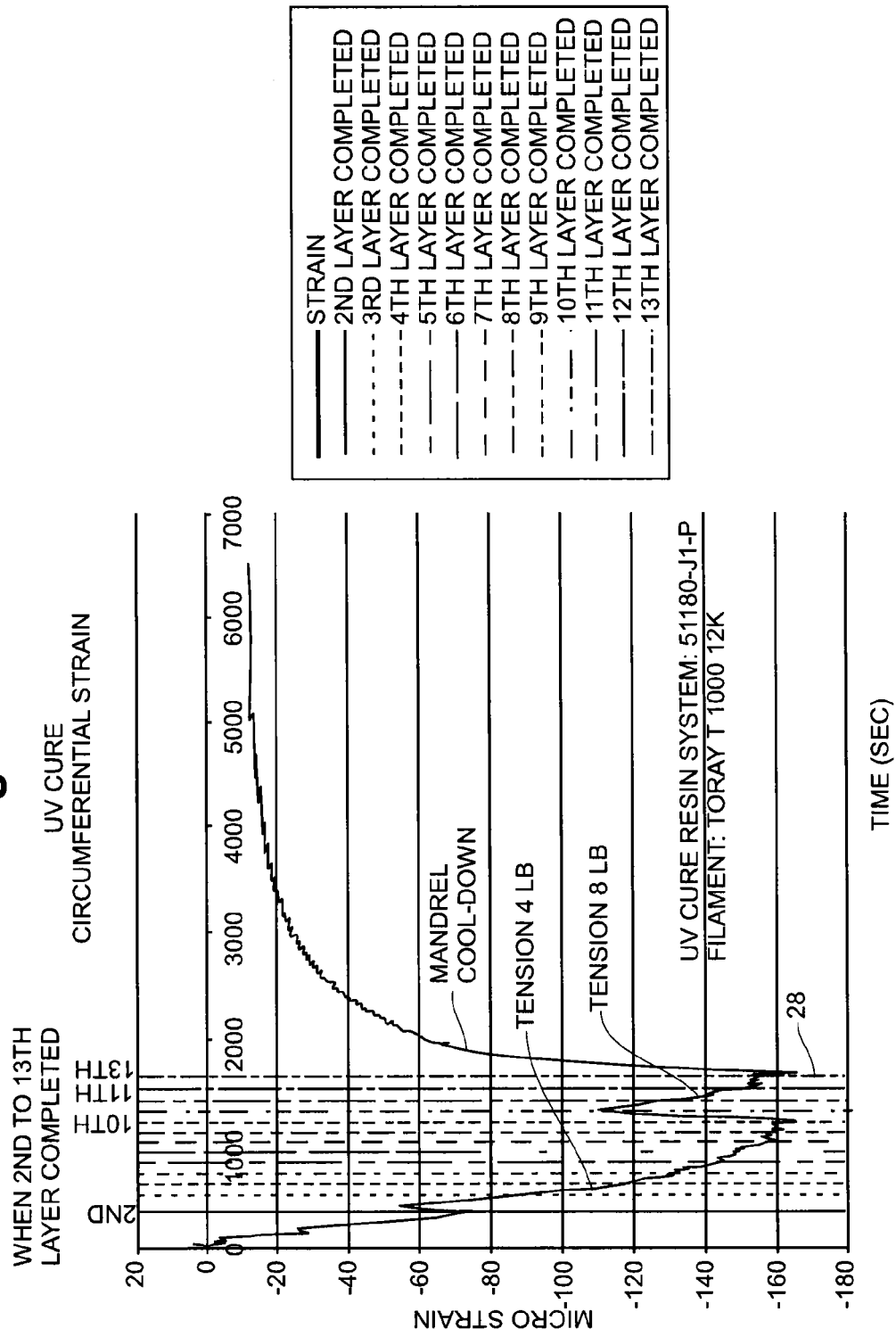
FIG. 15 is a graphic depiction of the UV cure of an epoxy based resin formulation 51180J-P impregnating fibers Toray T 1000 12K.

Importantly, in the present embodiment, the resin 21 impregnated upon the fibers 13 contains a ultra-violet responsive additive 30 that is useful in the subsequent quasi-instantaneous curing process. This additive 30 allows curing (polymerization) by an ultra-violet light 32 to quasi-instantly take place, thereby locking in the fiber tension thereby creating the desired prestresses. Such additives 30 include, but are not limited to: the epoxy based resin formulation 51180J-P made by UV Chemistry Inc. of Torrance, Calif., USA and epoxy based resin formulation EMI 612, made by Electrochemical Materials Inc. See FIG. 15 for a depiction of the UV cure of the epoxy based resin formulation 51180J-P impregnating fibers Toray T 1000 12K as it relates to time.

Once the fibers 13 have been sufficiently impregnated with resin 21 (containing the ultra-violet responsive additive 30) by a wet-out tank 20 or similar resin impregnator 18, the fibers 13 are wound in tension around the outer surface of a mandrel 16. These fibers 13 are wound in a controlled pattern around the outside surface of the mandrel 16 to form a hollow fiber structure 30. Cylindrical, tapered, or spherical shapes and tubes of various cross-section, length, and diameter can be formed.

As the fibers 13 are first wound around mandrel 16, an ultra-violet light source 32 is placed generally at the point of tangency of the fibers 13 with the mandrel 16 to effect the quasi-instantaneous curing proximate such point 36. Such curing is virtually totally effective at such point 36 for translucent fibers 13. For opaque fibers 13, a heat source 34 may used to further cure the resin coated fiber bundle 12.

Specifically, ultra-violet light source 32 is directed to the outside of the wound fibers 13 at the location 36 where the fiber bundle 12 comes into tangential contact with the mandrel 16. At this point 36, tangential and radial (normal) stresses are being experienced by the fiber bundle 12. The ultra-violet radiation given off by the light source 32 acts to polymerize (solidify) the resin matrix 21 impregnating the fiber bundle 12 in a quasi-instantaneous fashion. Polymerization and curing of the fibers 13 locks in the desirable tangential and radial stresses being experienced continually as the fibers 13 are wound around the mandrel 16. If not for such rapid curing, resin 21 would flow and migrate thereby causing tension to be lost. This curing is done at a rate even much faster than that done by instant prior art polymerization using heat, and therefore provides a diminished opportunity for resin migration and lost tension.

As noted above, a second, optional light source 34 is shown in the figures as well. This light source 34 is preferably directed at the inside (underside) surface of the fiber 13 being wound, at or just prior to the location 36 where the fibers 13 are first in tangential contact 36 with the mandrel 16. The second light source 34 may be either a secondary ultra-violet light source or an infrared heat source. For most fibers 13, especially the translucent fibers 13, ultra-violet light curing will be sufficient. However, for opaque fibers 13, such as carbon or graphite, the polymerization process may need to be augmented by use of infra-red radiative heating to ensure that the initial polymerization is maintained once exposure to ultra-violet light ceases. In some circumstances, a second ultra-violet light 34 may be used to simply augment the ultra-violet cure as the second light source 34 as well. Further, additional post curing of the resulting structure at an elevated temperature may be used to ensure that the resin is fully cured or polymerized.

Figure 4:
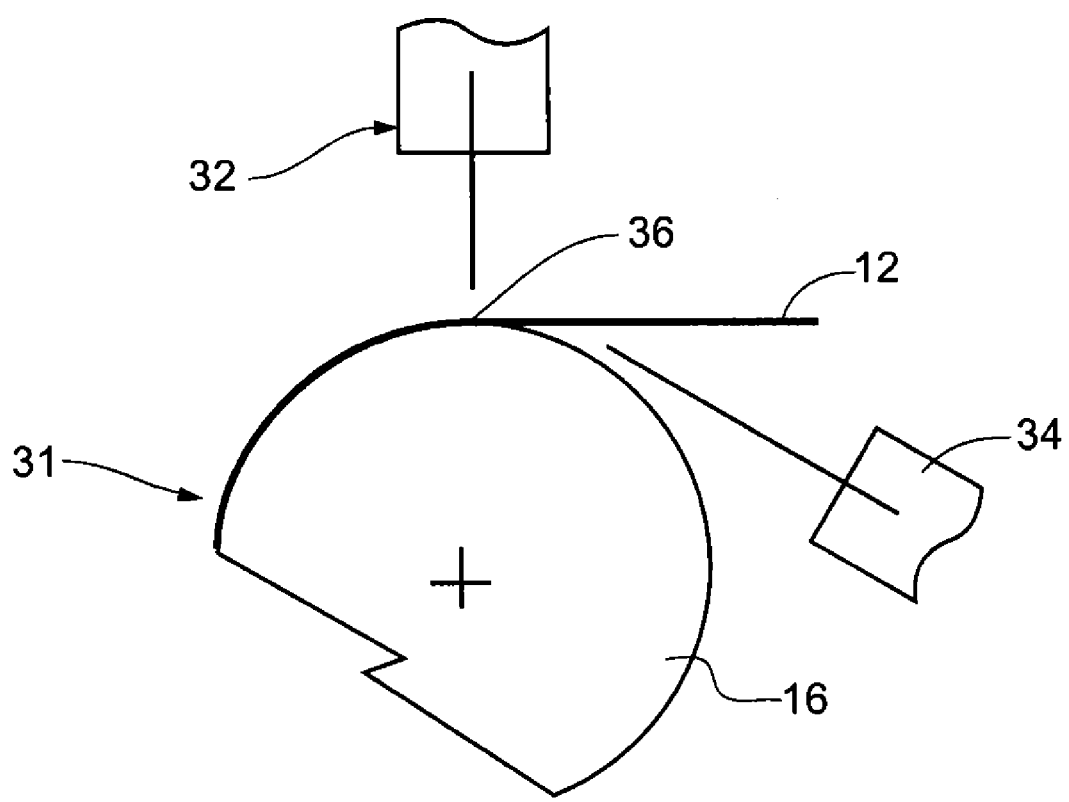
FIG. 4 is a schematic view of the mandrel engaged in a filament winding method according to an embodiment of the present invention.
Figure 5A:
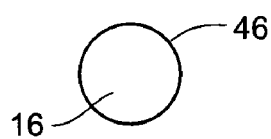
FIGS. 5a-d are typical alternative cross-sectional views of the mandrel according to an embodiment of the present invention.
Figure 5B:
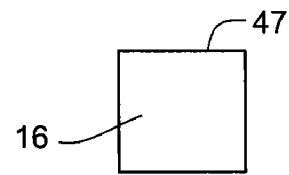
Figure 5C:
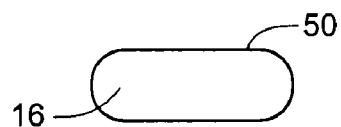
Figure 5D:
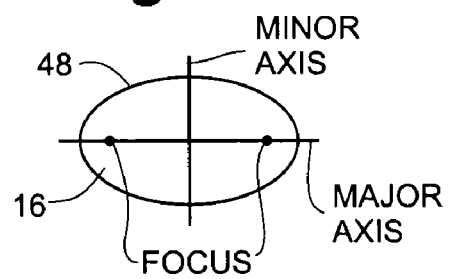

FIG. 4 shows a more detailed diagram of the mandrel 16 during filament winding operations. Ultra-violet light source 32 and secondary light source 34 are both directed to the area of fiber bundle 12 at or closely to the location 36 where the fiber 12 comes into tangential contact with the mandrel 16. The fiber bundle 12 is coated in liquid resin 21 (containing the ultra-violet responsive additive 30) as it approaches the mandrel 16. The subsequent polymerized fiber structure 31 surrounds the mandrel 16. Quasi-in situ curing takes place to cause the transformation between these two states (liquid and solid) and to maintain tension applied to the fibers 13 during the winding process.

FIGS. 5a-d set forth examples of possible cross-section shapes for the mandrel 16. The shape used for this mandrel component will determine the end shape of the fiber structure part produced in this process in cases where the fiber structure is to be removed from the mandrel 16. As shown, round or circular 46, rectangular 47, elliptical 48, or other 50 cross-section shapes (such as the race track shape depicted) are possible. The ellipse 48 can be distorted to form and oval or egg shape, as desired. In general, the shapes 46, 48 are designed to have a largely curved perimeter side so that radial forces can be experienced around the entire perimeter, the exception being a flat-sided cross section such as a square or rectangle 47 and the race track shape 50. It has been shown to be advantageous to locking in the prestress to have a point of tangency 36 at all points on the perimeter of the mandrel 16, as is described in greater detail below.

Figure 6A:
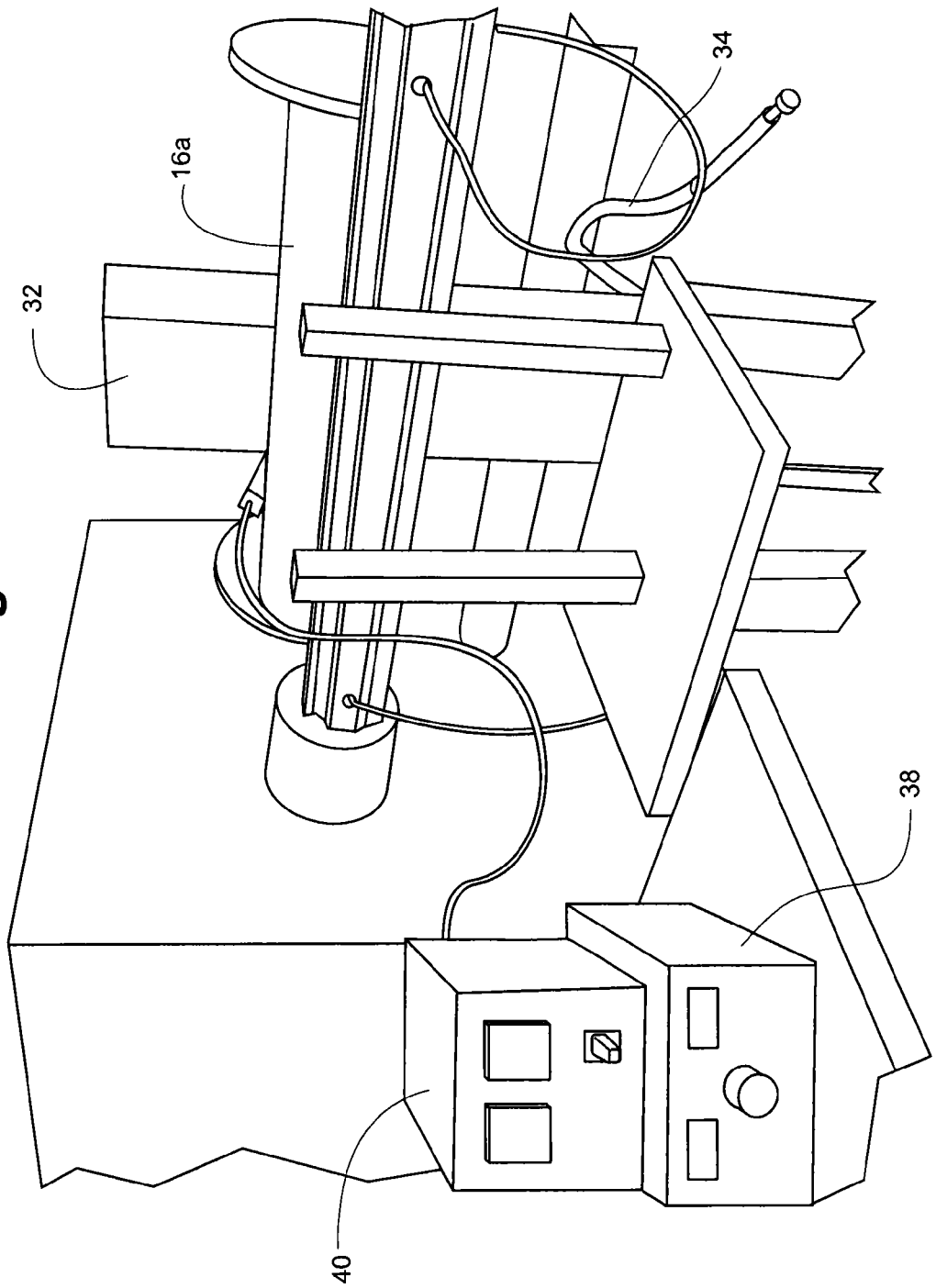
Figure 7:
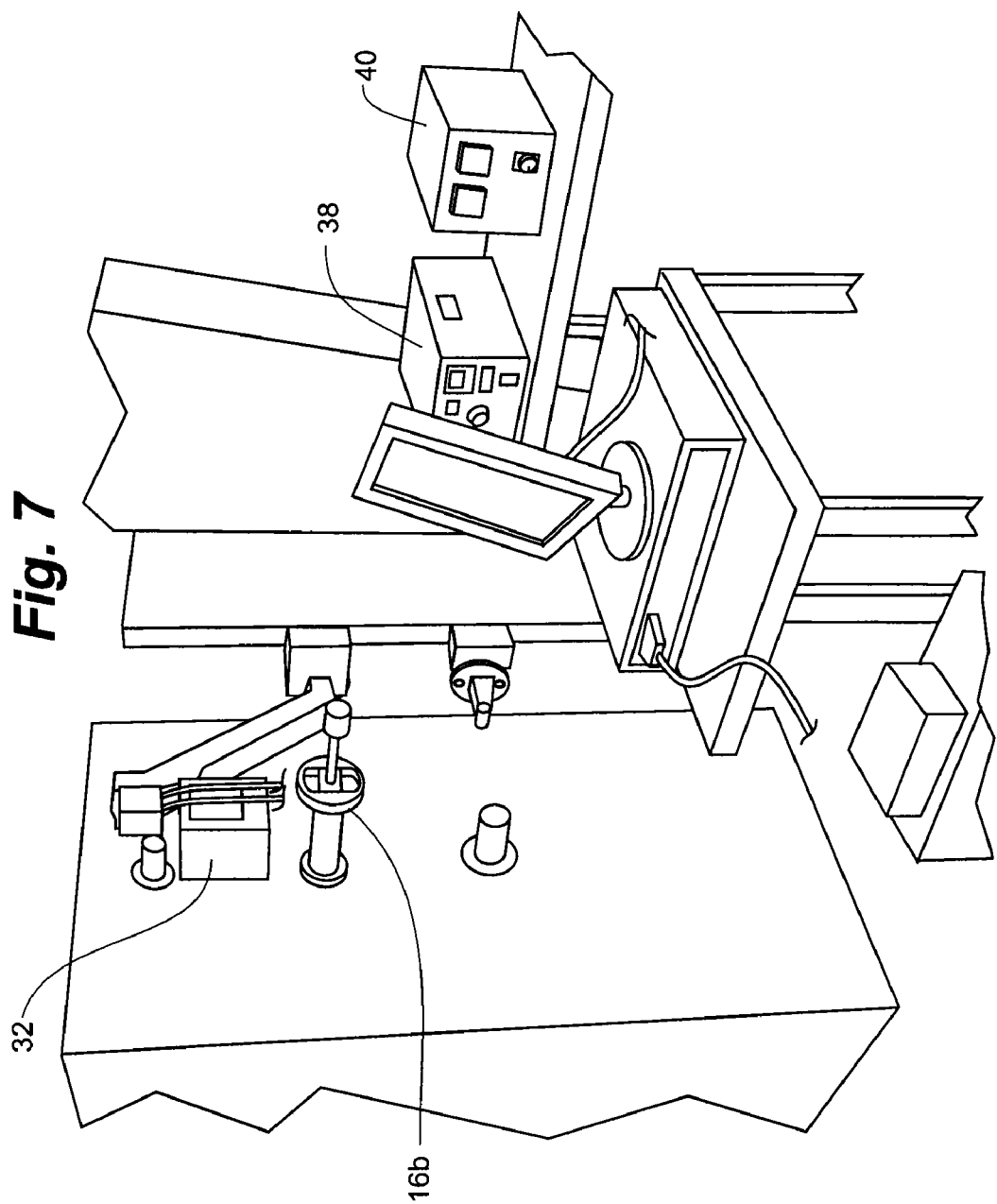
FIG. 7 shows the filament winding process according to an embodiment of the present invention.

FIGS. 6a-b and FIG. 7 set forth two different arrangements of equipment to perform the method of the present invention. FIGS. 6a and 6b show fiber bundle 12 being wound around a large barrel sized mandrel 16a suitable as a gin barrel or a rail gun. As illustrated by this set-up, mandrel 16 and resulting structures may be of small or very large sizes. An ultra-violet device 32, infra-red heaters 34, ultra-violet controller 38, and infra-red controller 40 are depicted mounted proximate the mandrel 16. The ultra-violet device 32, infra-red heaters 34, ultra-violet controller 38, and infra-red controller 40 may be easily adjusted and arranged relative to the mandrel 16 and point of tangency 36 to provide an optimal cure configuration for a selected shape component and material. This flexibility and adaptability of configuration has significant advantages over prior art curing methods.

FIG. 7 sets forth an arrangement in which a much smaller mandrel 16b can be seen. Once again, a very easy to adjust configuration is supplied. Ultra-violet light source 32 and ultra-violet power control 38 are included to provide the necessary curing as well as a secondary light source 34 and corresponding controller 40.

Performing the filament winding process can therefore be carried out using the steps of the disclosed method in which a user is able to produce a thick prestressed structure by filament winding composite materials that maintain fiber collimation and tension in the solidified structure. The first step includes, providing a plurality of filamentary fibers 13 in a fiber bundle 12 such as from a continuous source, such as spool 14. As indicated, this material may be carbon, graphite, glass, or other suitable material. This spool 14 of material is acted on by a resisting torque to place the filamentary material 13 in tension as winding progresses. Next, a user must impregnate a resin 21 (containing additives that are be caused to polymerize when exposed to ultra-violet light) onto a plurality of fibers 13 of the fiber bundle 12. This may be done by means of a drum-type wet out tank 20 or other impregnation means. The fibers 13 are then wound on a mandrel 16, the rotation of the mandrel 16 acting to overcome the resisting torque and to thereby place the fibers 13 in tension. The winding is such that the fibers 13 create radial and axial pressure due to the tension applied to the fibers 13.

The resin coated fibers 13 are then polymerized using ultra-violet light to cure the fibers quasi-instantaneously as the fibers 13 first come into contact with the mandrel 16 at a point of tangency 36 to create a polymerized structure 30. Radial and tangential stresses are accordingly continuously locked in the resulting mandrel-wound fiber element as the ultra-violet light quasi-instantly cures the resin coated fibers 13. When the fiber element is of desired thickness, it may be removed from the mandrel for further curing or use apart from the mandrel. In the case of the mandrel 16 being a gun barrel or rail gun, the polymerized fiber element is left in place to afford greater strength to the gun barrel or rail gun.

In some embodiments, impregnating the fibers 13 with resin 21 specifically involves using a wet-out tank 20 to infiltrate fiber filaments 13 with resin 21, although this impregnation of resin 21 may occur in several well-known manners. Further, in some embodiments an infra-red heater 34 is used to augment the cure of the resin, in addition to the ultra-violet curing light 32.

A number of applications are therefore made possible by the filament wound parts produced. One important application is that related to the fabrication of gun barrels and rail guns. In such applications, the solidified, prestressed fiber bundle 12 is left in place on the mandrel 16 (the gun barrel or rail gun). Particularly, rail guns are enhanced by high levels of radial prestress in order to react the magnetic forces which occur in the device. Specifically, it is desired that repulsive (outward directed) magnetic forces be opposed by prestress so that no separation of components that are acted upon by the repulsive magnetic forces occurs. Failing to have this prestress may result in the separation of the conductor and insulator components (noted in the embodiments described below) thereby generating gas plasmas and arcing. Therefore, a filament wound prestressed, solidified fiber bundle 12 helps to ensure that the noted components comprising the rail are held in intimate contact during the application of very high repelling magnetic forces characteristic of such devices when the rail gun is operated.

Applicant carried out a series of experiments in which the filament winding and ultra-violet curing technique noted above was evaluated for constructing a rail gun. Among other things, it was demonstrated during the investigation that it is possible to produce in-situ curing of both glass and carbon filaments 13 impregnated with resin matrices 21 and UV additives 30 that can be quasi-instantaneously polymerized using ultra-violet radiation. It was also shown that use of such in-situ curing permits the tension that is induced in the fiber filaments 13 to be maintained since resin migration and the resulting loss of tension that occurs with resin matrices that are not cured quasi instantaneously does not occur. A race track specimen 50 of the mandrel 16 was wound as indicated above. See FIGS. 5d and, particularly, 8. The specimen 50 has aluminum end caps 52 spaced apart by opposing insulators 54. The insulators 54 were preferably composed of high modulus carbon or Nextel insulator material. Strain gauges 59 were placed adjacent the insulators 54 on the opposed inner margins of the insulators 54. Winding was performed as indicated by the arrow 44.

Figure 8:
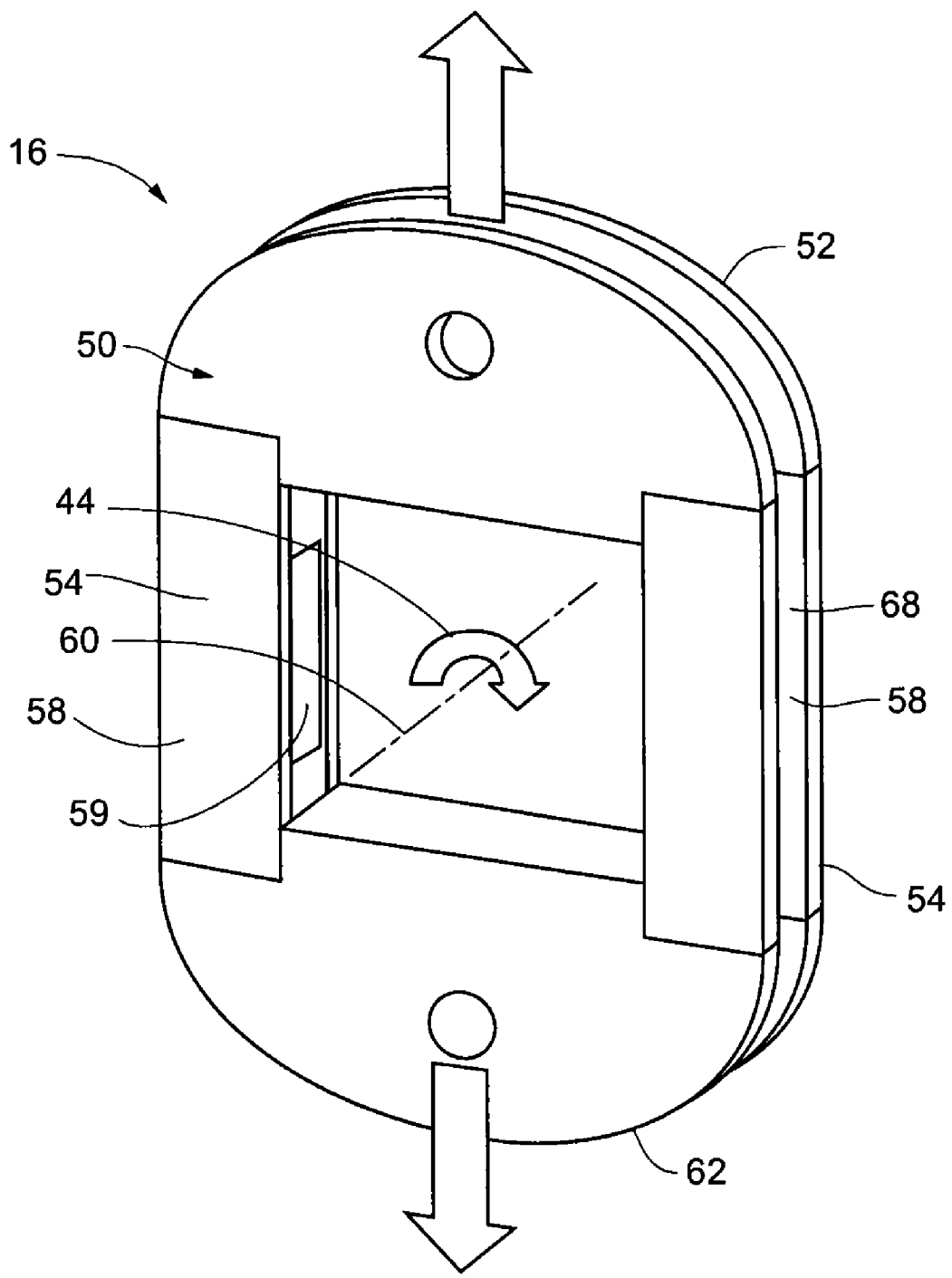
FIG. 8 is a perspective view of a mandrel having a racetrack cross section.
Figure 9:
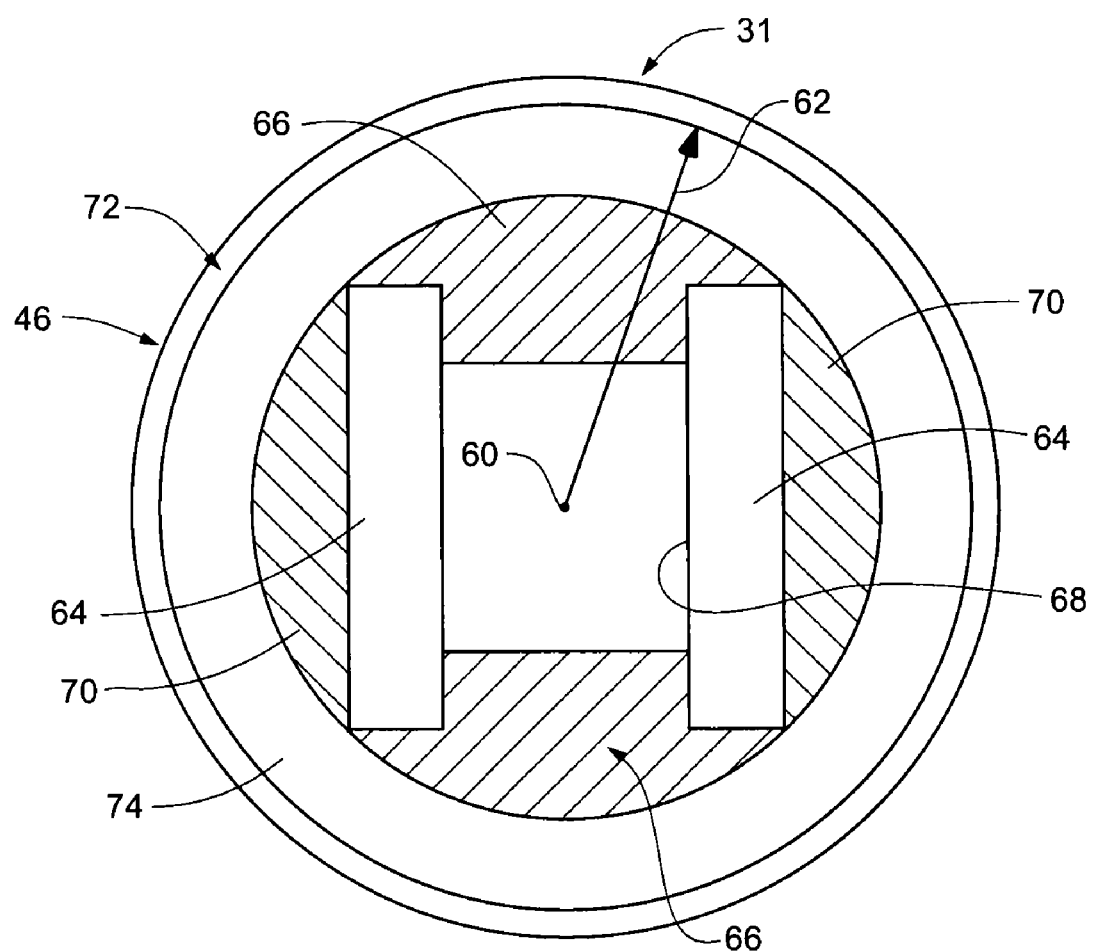
FIG. 9 is an end elevation view of a mandrel having a circular cross section.

Some problems were experienced when attempting to wind a typical "racetrack" configuration 50 for a barrel (mandrel 16) due to a lack of lateral pressure occurring on the straight sides 58. Therefore, using a rail gun (mandrel 16) design having some level of curvature of the sides is contemplated to alleviate this problem. Such a design can, at all locations on the exterior margin, be described by a radius 62 (see FIG. 9) extending from the longitudinal (axial) axis 60 (as depicted in FIG. 8) of the mandrel 16.

Figure 10:
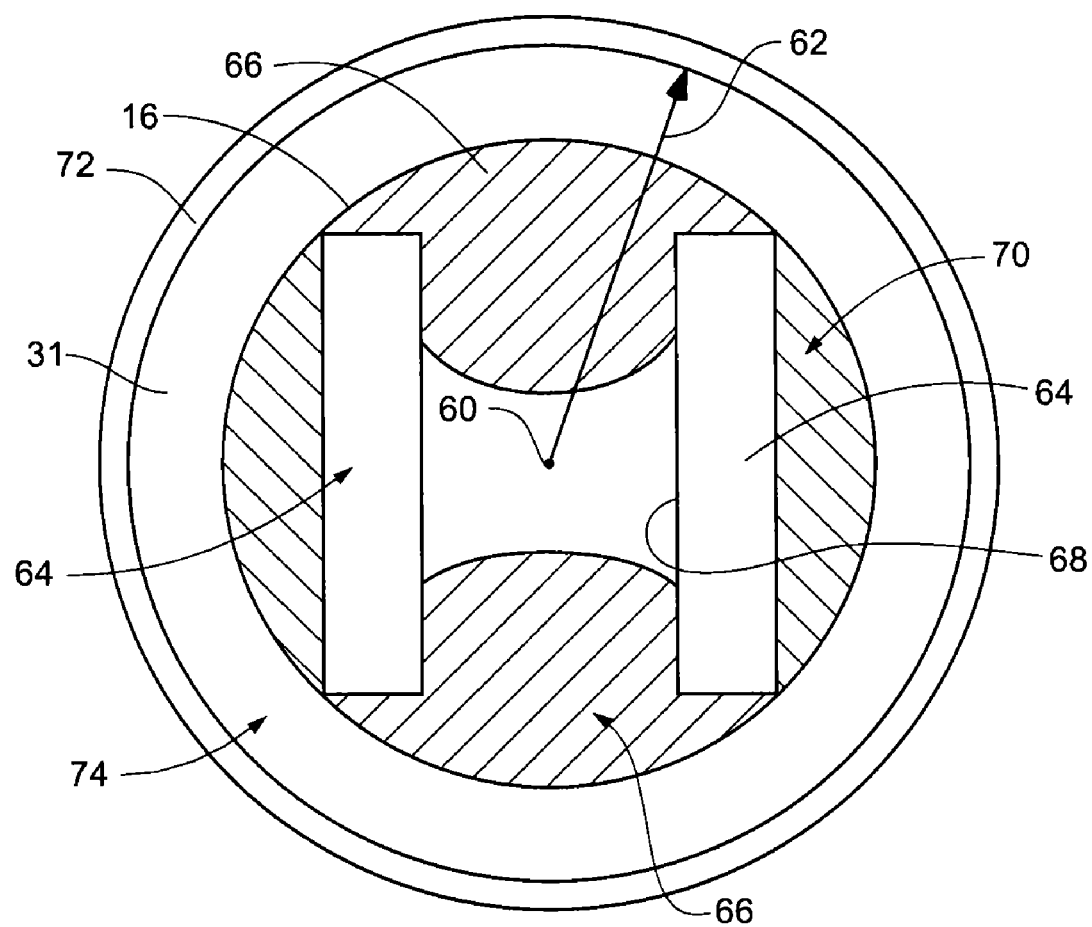
FIG. 10 is an end elevation view of a mandrel having a circular cross section having a further configuration of the conductor and insulator components.
Figure 11:
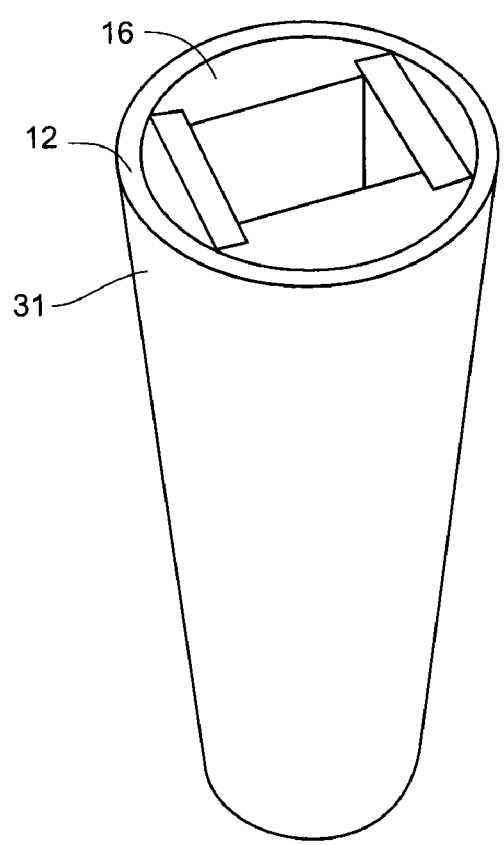
FIG. 11 is a perspective view of an elongate mandrel having conductor and insulator components as depicted in FIG. 9.
Figure 12:
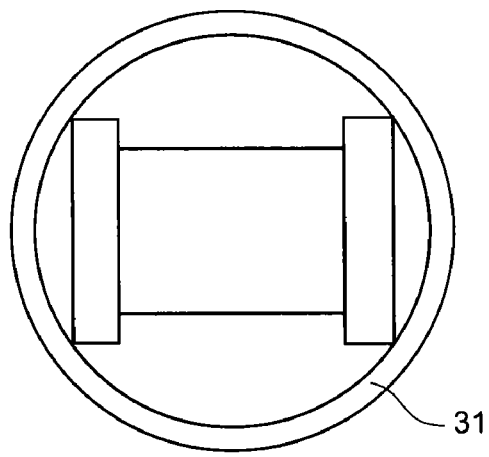
FIG. 12 is an end view of the mandrel of FIG. 11.
Figure 13:
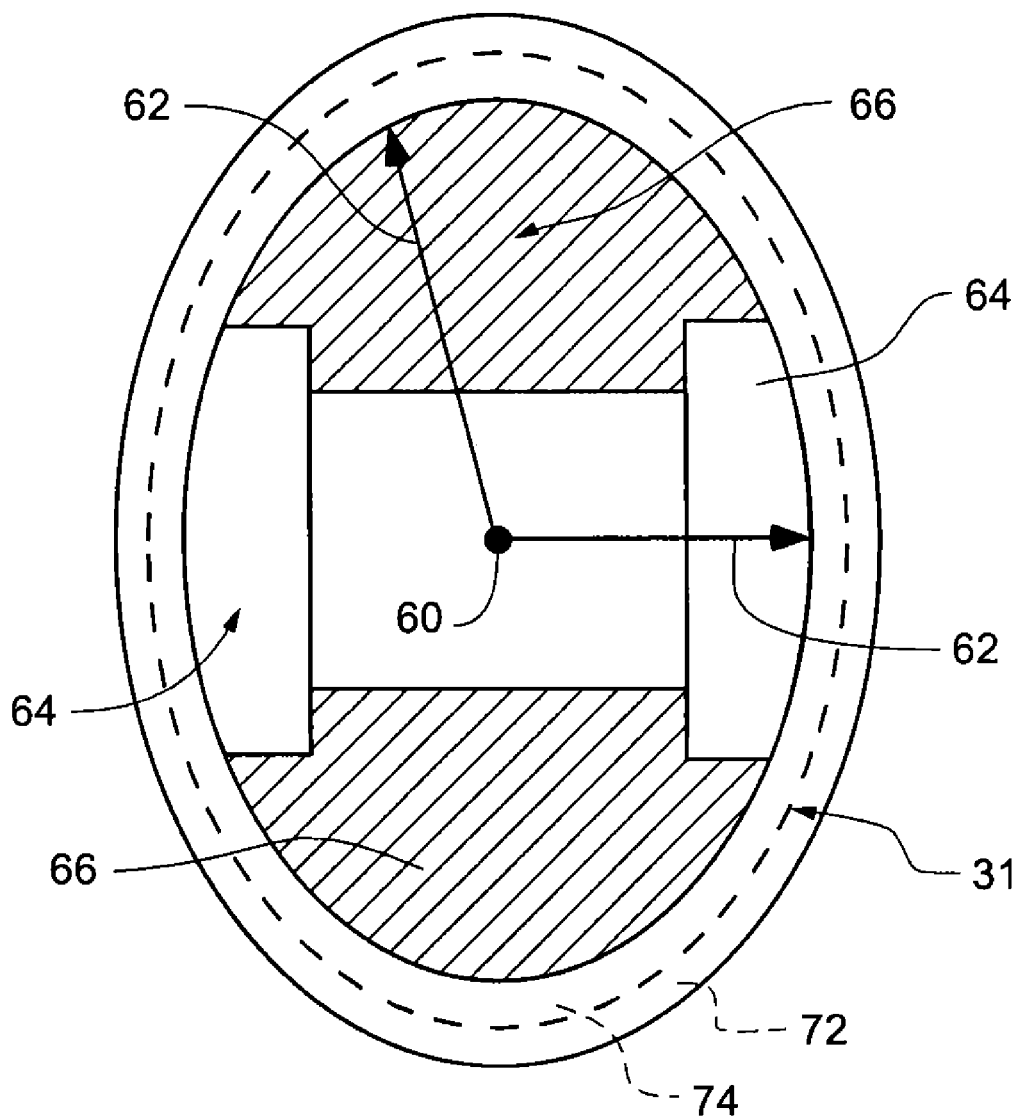
FIG. 13 is an end elevation view of a mandrel having an elliptical cross section.

A first such design that is circular in cross section is disclosed in FIGS. 9-12. FIGS. 11 and 12 depict an elongate section of a rail gun. FIG. 13 is a second such design being an elliptical configuration. The embodiments of FIGS. 9-12 include a pair of opposed insulators 64 spaced apart by a pair of conductors 66. Side cheeks 70 are interposed between the inside margin of the mandrel 16 and the outer margin of the insulators 64. An elongate axial aperture 68 is defined by the insulators 64 and conductors 66 in cooperation. Where the mandrel 16 forms a rail gun, a projectile is passed through the axial aperture 68 at extreme velocity. FIG. 13 is a second such design being an elliptical configuration. The radii 62 of the ellipse vary in length with the elliptical shape, but define all points on the exterior margin of the mandrel 16. The polymerized fiber structure 31 is preferably formed of both circumferential and helical wraps, the inner shell 74 being preferably circumferential wrapped and the outer shell 72 preferably being helical wound, as depicted in FIGS. 10 and 13. Further, preferably, the inner shell 74 of the polymerized fiber structure 31 is formed of Shell S2 glass epoxy and the outer shell 72 is formed of HM carbon or graphite. The outer shell 72 overlying the inner shell 74 may be autoclaved after the quasi-instantaneous polymerization.

Figure 14:
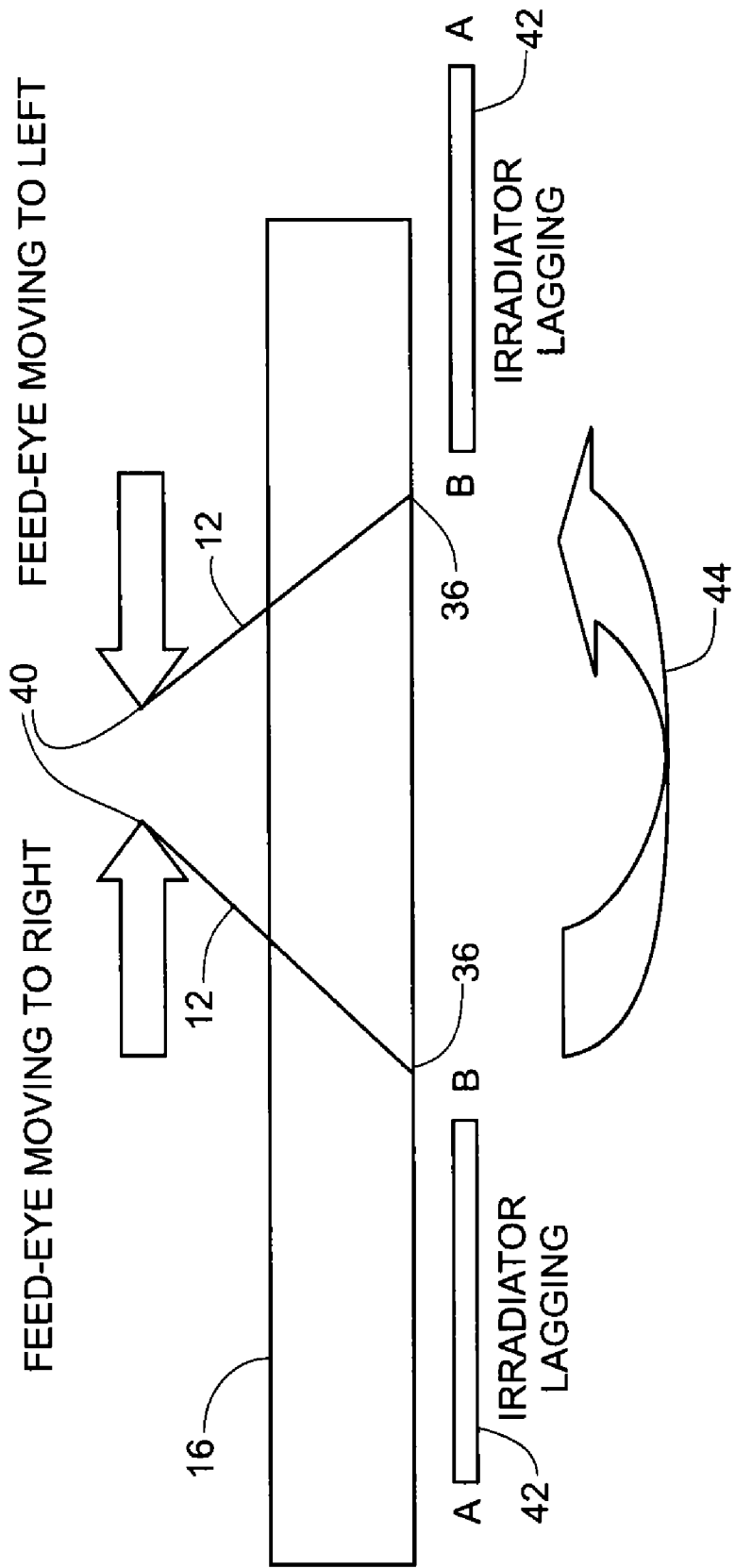
FIG. 14 is a schematic representation of helical winding with lagging strip irradiators in both winding directions.

As illustrated in FIG. 14, use of a strip irradiator 42 was demonstrated which would permit impregnated fiber 12 to be polymerized after being wound helically, as noted above. Such helical winding was cured after the fiber bundle 12 had been laid down. Irradiation of the resin matrix 21 was continued for a period of time consistent with the length of the strip irradiator 42 and winding rate of the fiber bundle 12 on the mandrel 1, as depicted in FIG. 14. A feed eye 40 feeds the fiber bundle 12 alternately to the right and to the left to lay the fiber bundle 12 alternately in a right helical and a left helical pattern on the rotating mandrel 16, rotation being as indicated by arrow 44. When moving in the right direction, the strip irradiator 42 also moves to the right, slightly lagging the point of tangential contact 36. Similar coordinated motion of the feed eye 40 and the irradiator 42 occurs in left sweeps of the feed eye 40 and the irradiator 42. Such lagging strip irradiator 42 permits laying the resin matrix 21 in both longitudinal directions on the mandrel 16 (rail gun). Accordingly, methods of constructing a rail gun are made possible by the present disclosure.

Steps for manufacturing a rail gun barrel include providing a plurality of fibers 13 that are placed in tension, impregnating a resin 21 containing ultra-violet sensitive additives 30 onto the plurality of fibers 13, winding the plurality of fibers 13 onto a mandrel 16 that comprises in part the product including a rail gun, and polymerizing fibers 13 quasi-instantaneously using ultra-violet light 32. The general outside configuration of such a product may preferably be circular or oval in cross section and of considerable length. In these embodiments, the tension used during the winding process may be maximized without damage to the fibers 13. Radial prestress helps to prevent separation of the insulators 64 from the conductors 66 under the influence of the repelling magnetic forces that occur during operation of a rail gun.

Other possible applications include conventional metal gun barrels, energy storing flywheels rims or pressure vessels. Conventional gun barrels will provide improved fatigue life and durability using this filament winding method to provide a prestressed structure exterior to the metal gun barrel. Also, because flywheel rims are highly stressed components having thick predominately hoop-wound composite rings that can be spun at very high speeds, they are accordingly very effective rotational energy storage components. Such devices can be used for emergency power supplies for military and commercial computers, rapid opening of missile silos, power conservation with cranes, regenerative braking in vehicles, etc. Use of prestressed materials is very important to each of these potential applications. These parts can therefore be produced using an "in situ" curing process which is cheaper and more flexible in application than those used for thermosetting resins such as in-situ mixing of resin and reactive curing agents. This is likewise applicable to the prestressing of thermoplastic resins used as matrices in filament winding which typically involves maintenance of tension in the fibers while the previously heated matrix is cooled to lock-in the fiber tension.

Although specific examples have been illustrated and described herein, it will be appreciated by those of ordinary skill in the art that any arrangement calculated to achieve the same purpose could be substituted for the specific example shown. This application is intended to cover adaptations or variations of the present subject matter. Therefore, it is intended that the invention be defined by the attached claims and their legal equivalents

What is claimed is:

1. A method of winding fibers on a mandrel, the wound fibers being in tension, comprising:
   providing a source of fibers, imposing a torque on the source that resists dispensing the fibers from the source to exert a tension on the fibers;
   adding ultra-violet sensitive material that is polymerized by exposure to ultra-violet light to a resin matrix;
   impregnating dispensed fibers with the additive containing resin matrix,
   rotating a mandrel to wind the impregnated fibers on the mandrel, the rotation of the mandrel acting to overcome the torque on the source and putting the fibers in tension; and
   in situ, quasi instantaneously polymerizing the additive containing resin matrix on the mandrel by exposing the additive containing resin matrix to ultra-violet light for a selected period of time, such polymerization acting to lock in the tension in the fibers at the time of polymerization.

2. The method of claim 1, including forming at least a portion of the fibers of an opaque material; providing an infra-red radiative heater proximate the mandrel and heating the resin matrix with the radiative heater after at least partial polymerization, thereby ensuring that polymerization is maintained after exposure to the ultra-violet light ceases.

3. The method of claim 1, including forming the mandrel with an outer margin which at all points has a radius, winding the fibers commencing at a point of tangency to the mandrel, and exposing the additive containing resin matrix to ultra-violet light proximate the point of tangency.

4. The method of claim 1, including winding the fibers helically on the mandrel and causing a strip ultra-violet light to lag behind a point at which the fiber is first applied to the mandrel.

5. The method of claim 1 wherein the ultra-violet sensitive material is one or of the materials selected from the list consisting of: the epoxy based resin formulation 51180J-P and the epoxy based resin formulation EMI 612.

6. The method of claim 1, including forming a gun barrel of the mandrel.

7. The method of claim 1, including forming a rail gun of the mandrel.

8. The method of claim 1, including forming a flywheel of the mandrel.

* * * * *